(12) United States Patent
Jhang et al.

(10) Patent No.: US 8,717,218 B2
(45) Date of Patent: May 6, 2014

(54) REGULAR EXPRESSION PATTERN MATCHING CIRCUIT BASED ON A PIPELINE ARCHITECTURE

(75) Inventors: Ching-Liang Jhang, Taipei (TW); Sheng-De Wang, Taipei (TW)

(73) Assignee: National Taiwan University, Taipei (TW)

( * ) Notice: Subject to any disclaimer, the term of this patent is extended or adjusted under 35 U.S.C. 154(b) by 916 days.

(21) Appl. No.: 12/390,924

(22) Filed: Feb. 23, 2009

(65) Prior Publication Data
US 2010/0158394 A1 Jun. 24, 2010

(30) Foreign Application Priority Data
Dec. 22, 2008 (TW) .............................. 97150013 A (51) Int. Cl.
H03M 1/34 (2006.01)
H03M 1/56 (2006.01)
H03M 1/58 (2006.01)
H04L 12/28 (2006.01)
H04J 3/06 (2006.01)
H03M 13/00 (2006.01)

(52) U.S. Cl.
USPC ........... 341/158; 341/164; 341/165; 341/169; 341/170; 370/419; 370/503; 714/758

(58) Field of Classification Search
USPC ............. 370/419; 341/58, 164, 165, 169, 170
See application file for complete search history.

(56) References Cited

U.S. PATENT DOCUMENTS

| 6,313,780 | B1* | 11/2001 | Hughes et al. | 341/156 |
| 2003/0204797 | A1* | 10/2003 | Lin | 714/718 |
| 2008/0072216 | A1* | 3/2008 | Zhao et al. | 717/143 |
| 2008/0234969 | A1* | 9/2008 | Goishi | 702/124 |
| 2009/0313526 | A1* | 12/2009 | Neuman | 714/758 |

* cited by examiner

Primary Examiner — Brandon Renner
(74) Attorney, Agent, or Firm — Edwards Wildman Palmer LLP; Peter F. Corless; Steven M. Jensen (57) ABSTRACT

A regular expression pattern matching circuit based on a pipeline architecture is proposed, which is designed for integration to a data processing system, such as a computer platform, a firewall, or a network intrusion detention system (NIDS), for checking whether an input code sequence (such as a network data packet) is matched to specific patterns predefined by regular expressions. The proposed circuit architecture includes an incremental improvement on an old combination of a comparator circuit module and an NDFA (non-deterministic finite-state automata) circuit module, where the incremental improvement comprises a data signal delay circuit module installed to the comparator circuit module and an enable signal delay circuit module installed to the NDFA circuit module to thereby constitute a multi-sage pipeline architecture that allows a faster processing speed than the prior art.

20 Claims, 10 Drawing Sheets

| RULE | REGULAR EXPRESSION |
|---|---|
| 1 | REG_EXP(1) |
| 2 | REG_EXP(2) |
| 3 | REG_EXP(3) |
| ⋮ | ⋮ |
| ⋮ | ⋮ |
| N | REG_EXP(N) |

REGULAR EXPRESSION PATTERN MATCHING CIRCUIT BASED ON A PIPELINE ARCHITECTURE

BACKGROUND OF THE INVENTION

1. Field of the Invention

This invention relates to logic circuit technology, and more particularly, to a regular expression pattern matching circuit based on a pipeline architecture which is designed for integration to a data processing system, such as a computer platform, a firewall, or a network intrusion detection system (NIDS), for checking whether an input code sequence (such as a network data packet) is matched to specific patterns predefined by regular expressions.

2. Description of Related Art

In the application of computer network systems, how to prevent the intrusion of hackers or malicious virus programs is an important research effort in the information industry. Presently, firewalls and NIDS (network intrusion detention system) are the most widely utilized technologies for this purpose. In operation, all incoming and outgoing network data packet are scanned to check whether their patterns are matched to the patterns of known packets from hackers or malicious virus programs. If a match is found, then the network data packet is blocked or discarded from entering into the network system.

Present network systems typically utilize regular expressions for description of the packet data patterns of known hackers or malicious virus programs. Presently, one practical implementation for regular expression pattern matching is to use a logic circuit composed of a comparator circuit module and a non-deterministic finite-state automata (NDFA) circuit module, which is described in more details in the following with reference to FIG. 1 through FIGS. 3A-3B.

Figure 1:
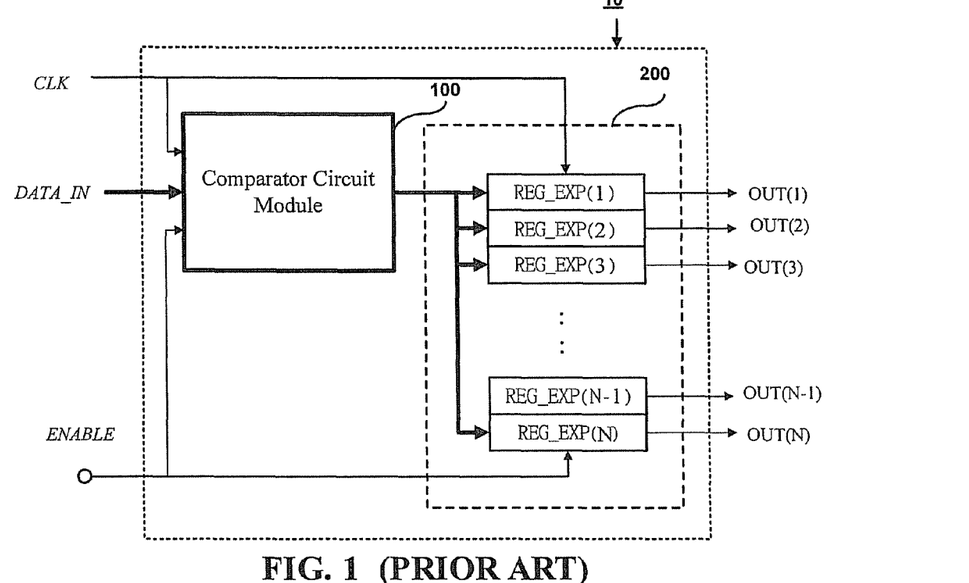
FIG. 1 (PRIOR ART) is a schematic diagram showing the circuit architecture of a conventional regular expression pattern matching circuit.

FIG. 1 shows the circuit architecture of a conventional regular expression pattern matching circuit 10 (hereinafter referred to as "prior art"). As shown, this prior art comprises: (A) a comparator circuit module 100; and (B) a non-deterministic finite-state automata (NDFA) circuit module 200.

The conventional regular expression pattern matching circuit 10 has an input interface and an output interface, wherein the input interface includes a data input port DATA_IN, an enable signal input port ENABLE, and a clock signal input port CLK; while the output interface includes an array of N output ports [OUT(1), OUT(2), . . . , OUT(N)]. In this example, the data input port DATA_IN is an 8-bit bus for sequentially transferring a series of 8-bit characters of an input code sequence; the enable signal input port ENABLE is used for reception of an enable signal for enabling the operation of the conventional regular expression pattern matching circuit 10; and the clock signal input port CLK is used for reception of a clock signal. The N output ports [OUT(1), OUT(2), . . . , OUT(N)] are each a 1-bit data line whose output signal is used for indicating which regular expression is matched to the input code sequence, i.e., if the (k)th regular expression is a match, then the (k)th output port OUT(k) will output a logic-HIGH signal (1) while all the other output ports remain at logic-LOW state (0).

Figure 2:
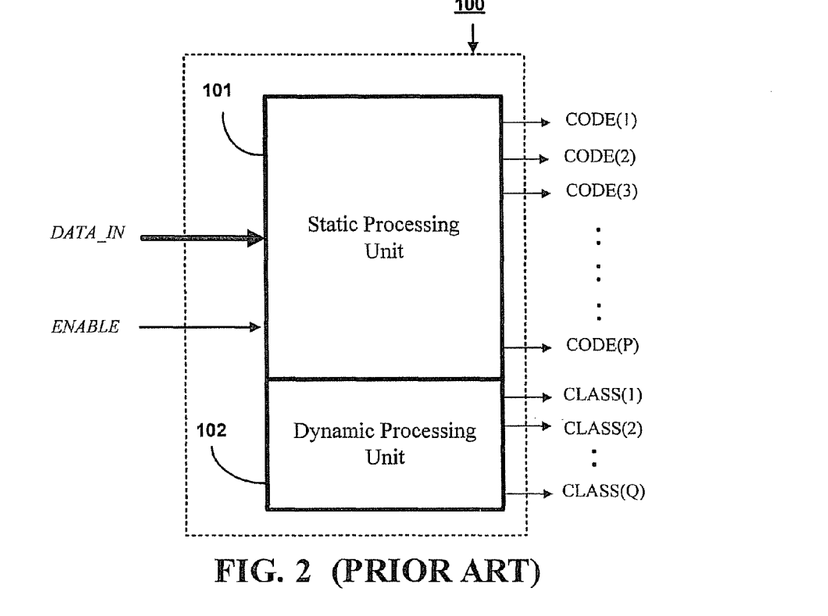
FIG. 2 (PRIOR ART) is a schematic diagram showing the internal architecture of a comparator circuit module utilized by the prior art shown in FIG. 1.

As shown in FIG. 2, in one application example of the conventional regular expression pattern matching circuit 10, the comparator circuit module 100 includes a static processing unit 101 and a dynamic processing unit 102; wherein the static processing unit 101 has an output interface including P output ports: CODE(1), CODE(2), . . . , CODE(P), whose output values are used for indicating the meaning, role, or function of each character in the input code sequence; while the dynamic processing unit 102 includes Q output ports: CLASS(1), CLASS(2), . . . , CLASS(Q), whose output values are used for indicating the class of each character in the input code sequence. In one practical application, for example, P=290 and the 290 output signals are used respectively for indicating 256 ASCII characters, a set of predefined character ranges, a set of special symbols, a set of special characters (such as blank, non-blank, single word, non-single word, integer, and non-integer), and 26 case-insensitive English alphabetic letters; while the Q output ports are used for indicating predefined classes such as [\x90-\xFF] and [^\s].

Figure 3A:
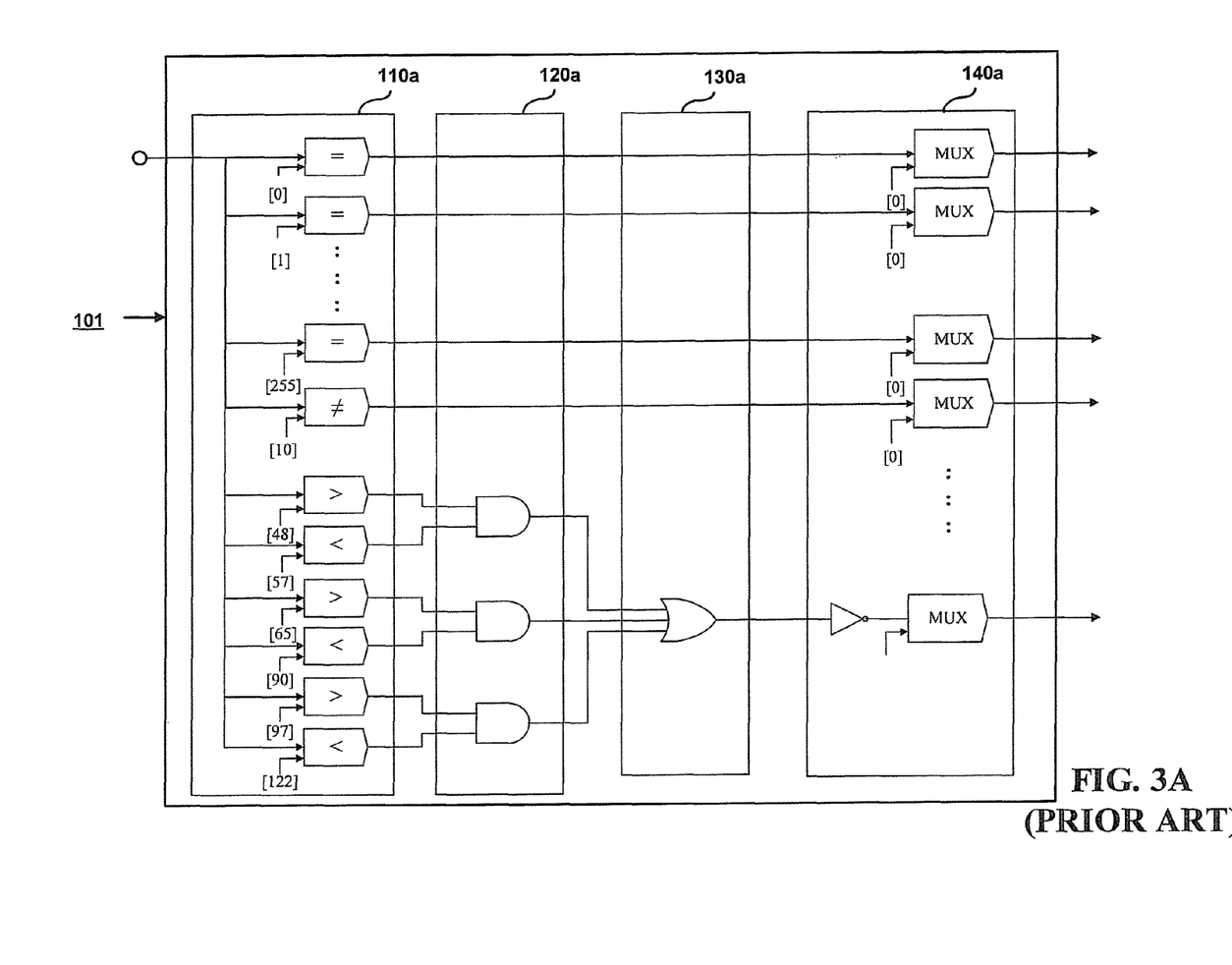
FIG. 3A (PRIOR ART) is a schematic diagram showing the internal architecture of a static processing unit utilized by the comparator circuit module shown in FIG. 2.

FIG. 3A shows the internal circuit architecture of the above-mentioned static processing unit 101, which is composed of 4 layers of logic circuits, including a first-layer logic circuit 110a, a second-layer logic circuit 120a, a third-layer logic circuit 130a, and a fourth-layer logic circuit 140a. The first-layer logic circuit 110a is an array of digital comparators, including equal comparators (=), unequal compactors (≠), larger-than compactors (>), and less-than compactors (<). The second-layer logic circuit 120a and the third-layer logic circuit 130a are a plurality of AND gates and OR gates which are specifically arranged to operate in combination for checking whether the value of a character is within a predefined range. The fourth-layer logic circuit 140a is an array of multiplexers (MUX).

Figure 3B:
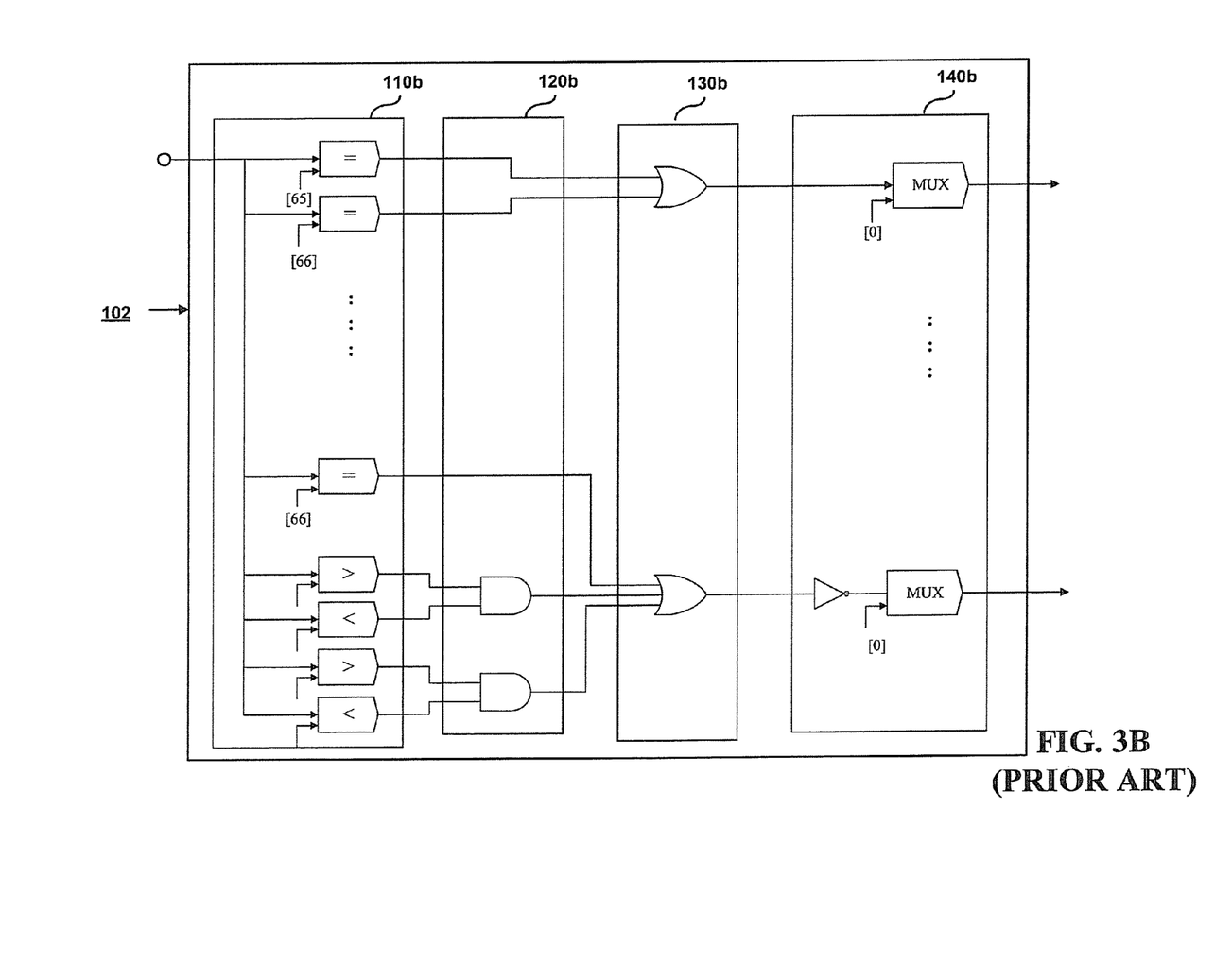
FIG. 3B (PRIOR ART) is a schematic diagram showing the internal architecture of a dynamic processing unit utilized by the comparator circuit module shown in FIG. 2.

Further, FIG. 3B shows the internal circuit architecture of the dynamic processing unit 102, which is also composed of 4 layers of logic circuits, including a first-layer logic circuit 110b, a second-layer logic circuit 120b, a third-layer logic circuit 130b, and a fourth-layer logic circuit 140b. The first-layer logic circuit 110b is an array of digital comparators, including equal comparators (=), unequal compactors (≠), larger-than compactors (>), and less-than compactors (<). The second-layer logic circuit 120b and the third-layer logic circuit 130b are a plurality of AND gates and OR gates. The fourth-layer logic circuit 140b is an array of multiplexers (MUX).

One drawback to the circuit architecture of the conventional regular expression pattern matching circuit 10, however, is that the multi-layer architecture (i.e., 4-layer architecture) of the comparator circuit module 100 causes a time delay such that after the NDFA circuit module 200 is enabled, the NDFA circuit module 200 has to wait until the comparator circuit module 100 completes its logic operation to start operation. This time delay undoubtedly cause a degrade in the overall processing speed.

SUMMARY OF THE INVENTION

It is therefore an objective of this invention to provide a new and improved regular expression pattern matching circuit based on a pipeline architecture that can offer a faster processing speed than the prior art.

In application, the regular expression pattern matching circuit according to the invention is designed for integration to a data processing system, such as a computer platform, a firewall, or a network intrusion detection system (NIDS), for checking whether an input code sequence (such as a network data packet) is matched to specific patterns predefined by regular expressions.

In architecture, the new and improved regular expression pattern matching circuit according to the invention comprises: (A) a comparator circuit module; (B) a regular expression pattern matching module which is here implemented with a non-deterministic finite-state automata (NDFA) circuit module; (C) a data signal delay circuit module; and (D) an enable signal delay circuit module.

The new and improved regular expression pattern matching circuit of the invention provides an incremental improvement on the prior art, which is based on an old combination of a comparator circuit module and a NDFA circuit module, where the incremental improvement comprises a data signal delay circuit module installed to the comparator circuit module and an enable signal delay circuit module installed to the NDFA circuit module to thereby constitute a multi-sage pipeline architecture that allows a faster processing speed than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The new and improved regular expression pattern matching circuit based on a pipeline architecture according to the invention is disclosed in full details by way of preferred embodiments in the following with reference to the accompanying drawings FIG. 4 through FIG. 11.

Application and Function of the Invention

Figure 4:
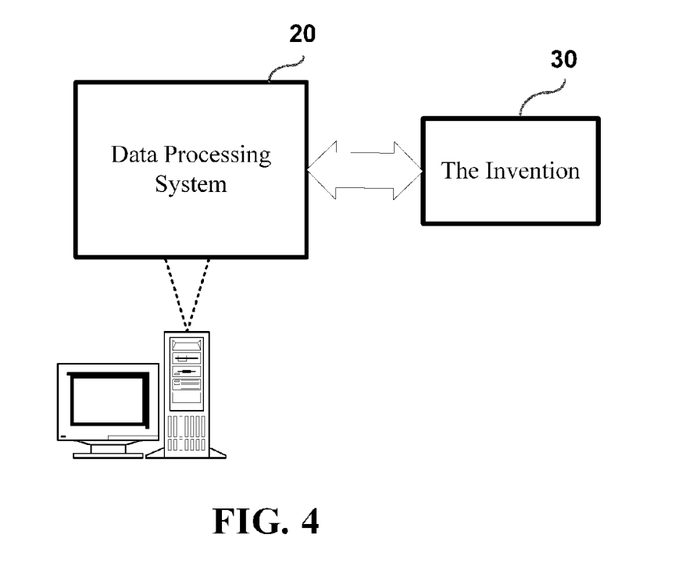
FIG. 4 is a schematic diagram showing an example of the application of the new and improved regular expression pattern matching circuit of the invention.

FIG. 4 shows the application of the new and improved regular expression pattern matching circuit of the invention (which is here encapsulated in a box labeled with the reference numeral 30). As shown, in this application example, the regular expression pattern matching circuit of the invention 30 is used for integration to a data processing system 20, such as a computer unit, a firewall, or a network intrusion detection system (NIDS), for equipping the data processing system 20 with a regular expression pattern matching function.

Figure 5:
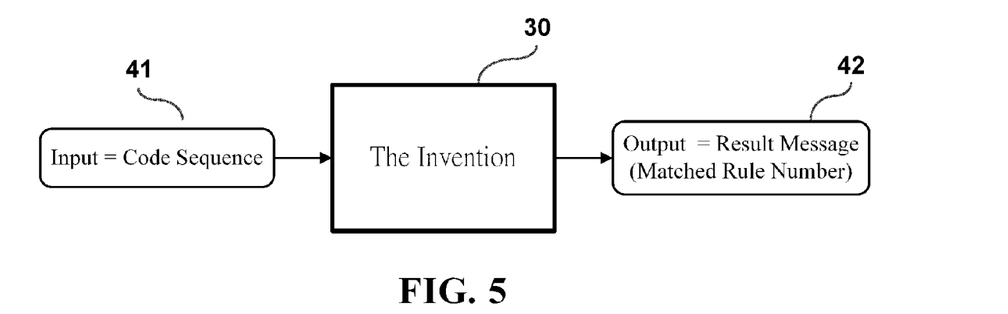
FIG. 5 is a schematic diagram showing the I/O functional model of the new and improved regular expression pattern matching circuit of the invention.

FIG. 5 shows the I/O (input/output) functional model of the regular expression pattern matching circuit of the invention 30. As shown, the invention is used for processing an input code sequence 41 received by the data processing system 20 with the purpose of checking whether the pattern of the input code sequence 41 is matched to one or more specific patterns that are predefined by a set of N regular expressions specified in a regular expression database 21 shown in FIG. 6. The end processing result is outputted as a result message 42 which shows the match/mismatch status of the input code sequence 41 and, if the result is a match, further indicates which regular expression in the regular expression database 20 is matched to the input code sequence 41.

In practical applications, for example, the input code sequence 41 can be a text string or a network data packet. For example, in the application with a computer platform, the invention can be used for checking whether an input text string supplied by a user trying to log in to the computer platform is a valid and authorized username or password. In the application with a firewall or NIDS, the invention can be used for checking whether an incoming network data packet is originated from a hacker or malicious virus program. Moreover, the input code sequence 41 can be either an ASCII (American Standard Code for Information Interchange) or EBCDIC (Extended Binary Coded Decimal Interchange Code) compliant code sequence.

Architecture of the Invention

Fundamentally, the invention provides an incremental improvement on the prior art shown in FIG. 1 through FIGS. 3A-3B by adding a pipeline architecture to the prior art. In accordance with the invention, 3 different preferred embodiments are disclosed in the following, wherein the first preferred embodiment is the best mode embodiment.

First Preferred Embodiment

Figure 7:
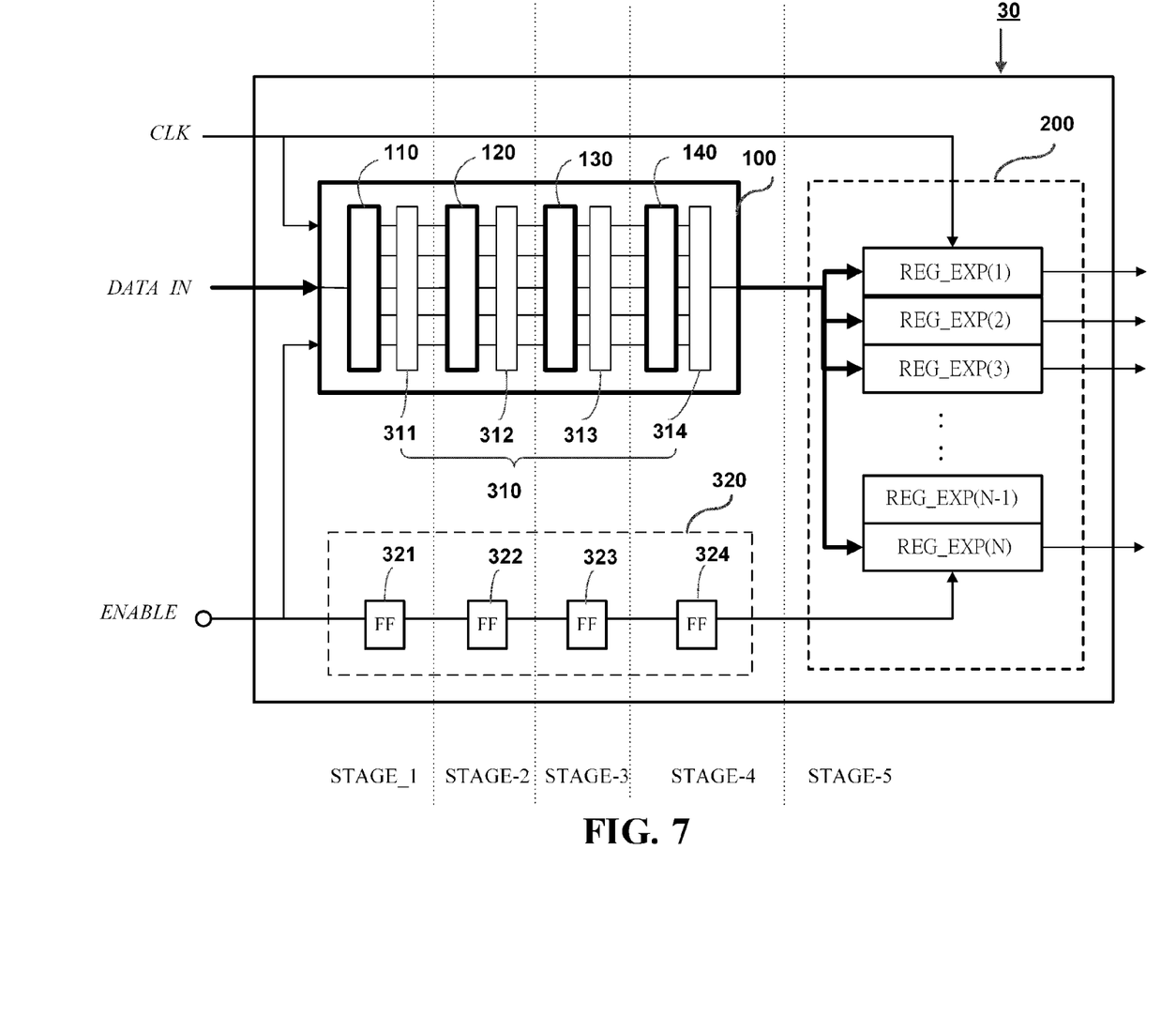
FIG. 7 is a schematic diagram showing the architecture of a first preferred embodiment of the new and improved regular expression pattern matching circuit of the invention.

Referring to FIG. 7, the first preferred embodiment of the regular expression pattern matching circuit of the invention 30 comprises: (A) a comparator circuit module 100; (B) a regular expression pattern matching module which is here implemented with a non-deterministic finite-state automata (NDFA) circuit module 200; (C) a data signal delay circuit module 310; and (D) an enable signal delay circuit module 320 (note that components that are the same as the prior art are labeled with the same reference numerals). Firstly, the respective attributes and functions of these constituent components of the invention are described in details in the following.

As shown in FIG. 7, the comparator circuit module 100 is based on a multi-layer circuit architecture including a number of layers of logic circuits, such as 4 layers including a first-layer logic circuit 110, a second-layer logic circuit 120, a third-layer logic circuit 130, and a fourth-layer logic circuit 140. In the circuit representation of FIG. 7, the first-layer logic circuit 110 represents a combined assembly of the two first-layer logic circuits (110a, 110b) of the static processing unit 101 and the dynamic processing unit 102 shown in FIGS. 3A-3B; the second-layer logic circuit 120 represents a combined assembly of the two second-layer logic circuits (120a, 120b); the third-layer logic circuit 130 represents a combined assembly of the two third-layer logic circuits (130*a*, 130*b*); and the fourth-layer logic circuit 140 represents a combined assembly of the two fourth-layer logic circuits (140*a*, 140*b*). In actual implementation, for example, the comparator circuit module 100 can be realized by using an FPGA (Field Programmable Gate Array) module.

Figure 6:
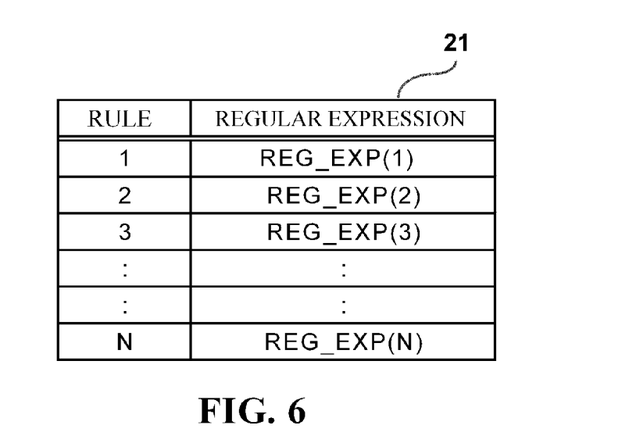
FIG. 6 is table depicting a regular expression database for use with the invention.
Figure 11:
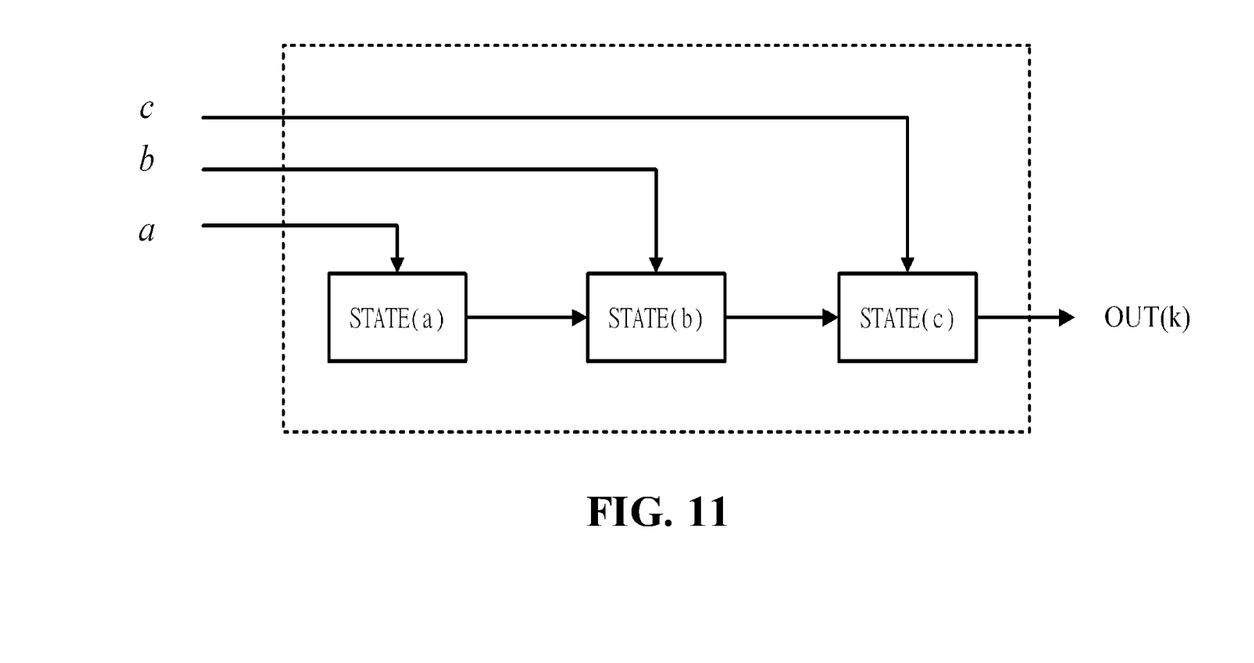
FIG. 11 is a schematic diagram showing an example of the internal architecture of the NDFA circuit module utilized by the invention.

The NDFA circuit module 200 is composed of N state transition based pattern matching units which are respectively used for pattern matching of the N regular expressions defined in the regular expression database 21 shown in FIG. 6. For example, as depicted in FIG. 11, assume that the (k)th pattern matching unit is set to the pattern [abc], then its internal logic circuit architecture includes 3 state transition unit STATE(a), STATE(b), and STATE(c) as illustrated in FIG. 11. In operation, when the first state transition unit STATE(a) receives the data "a", then its output port will generate a logic-HIGH signal for enabling the second state transition unit STATE(b); and subsequently if the enabled second state transition unit STATE(b) receives the data "b" in the next cycle, then it will generate an output of a logic-HIGH signal for enabling the third state transition unit STATE(c); and finally if the enabled third state transition unit STATE(c) receives the data "c" in the next cycle, then it will generate an output of a logic-HIGH signal which can be used for indicating that the processing result is a match. On the contrary, if the output of the third state transition unit STATE(c) is a logic-LOW signal, then it indicates that the processing result is a mismatch. Since the NDFA is well known and widely utilized technology in the information industry, details thereof will not be further described in this specification.

As shown in FIG. 7, in the first preferred embodiment, the data signal delay circuit module 310 includes 4 stages of buffer arrays: a first-stage buffer array 311, a second-stage buffer array 312, a third-stage buffer array 313, and a fourth-stage buffer array 314. These 4 buffer arrays (311, 312, 313, 314) are respectively coupled to the output ends of the first-layer logic circuit 110, the second-layer logic circuit 120, the third-layer logic circuit 130, and the fourth-layer logic circuit 140; and each of which is used for providing a one-cycle delayed buffer function to the output data at the respective output ports of these 4 layers of logic circuits (110, 120, 130, 140).

Figure 8A:
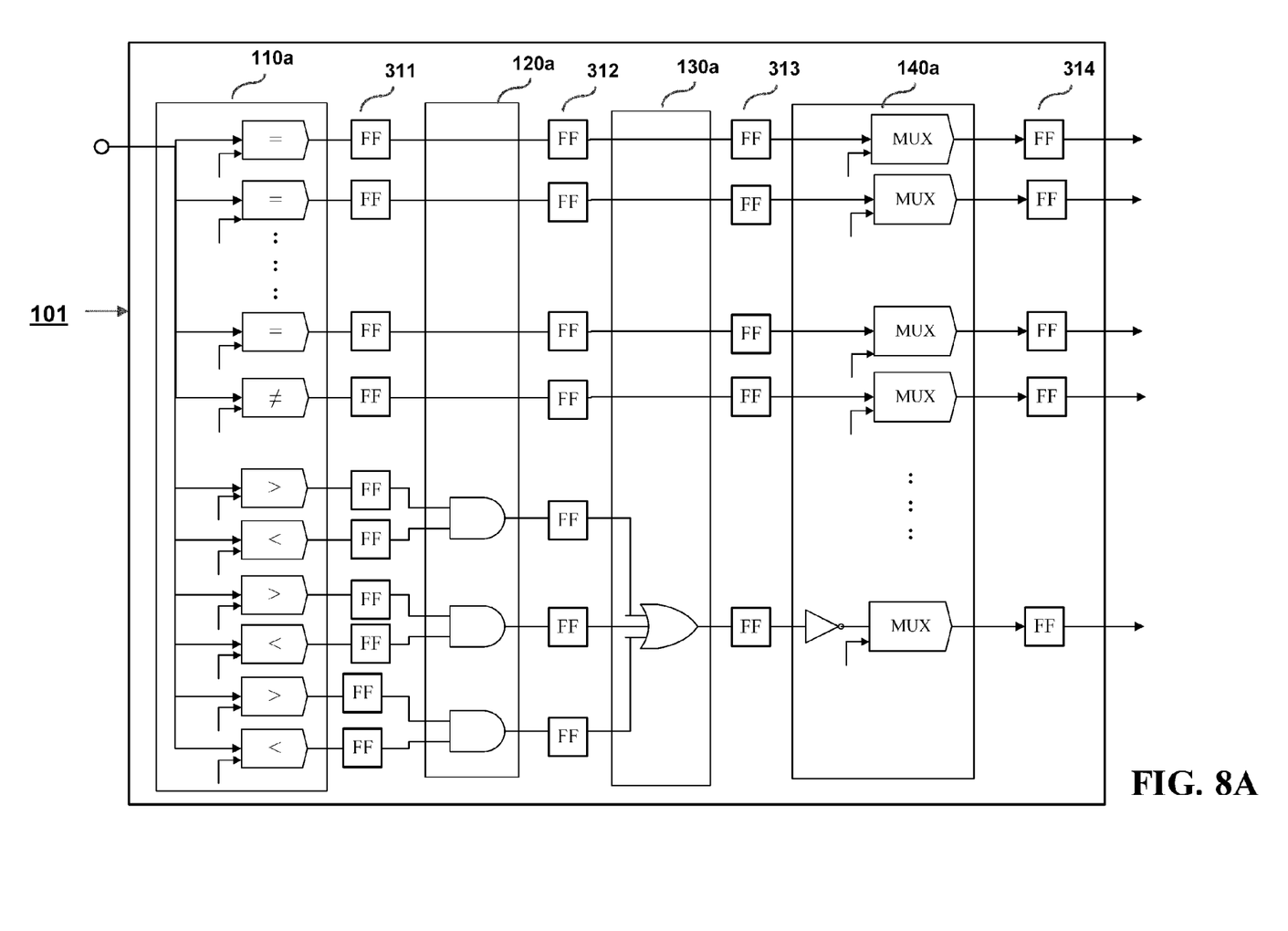
FIG. 8A is a schematic diagram showing the installation of the data signal delay circuit module in the static processing unit in accordance with the first preferred embodiment of the invention.
Figure 8B:
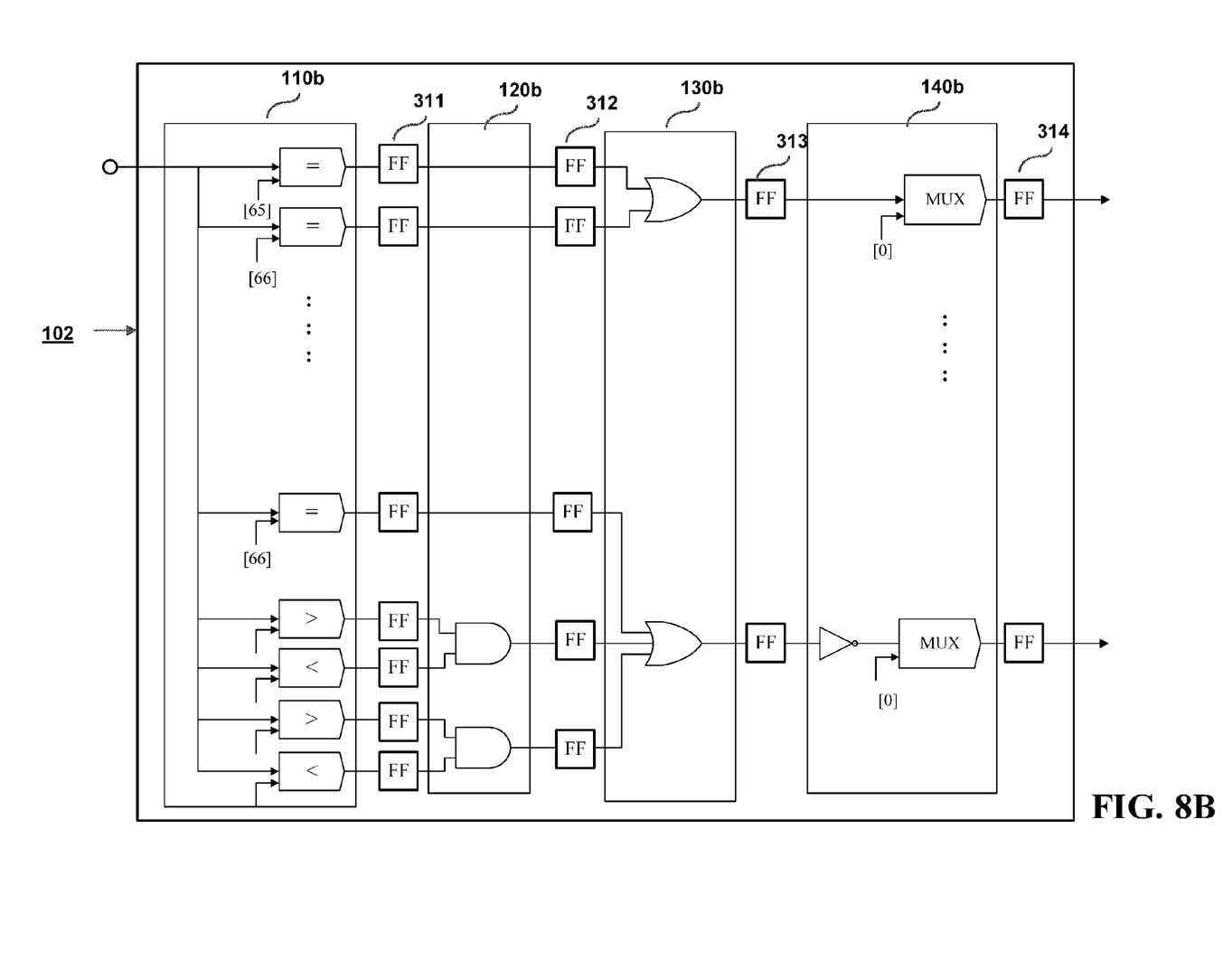
FIG. 8B is a schematic diagram showing the installation of the data signal delay circuit module in the dynamic processing unit in accordance with the first preferred embodiment of the invention.

FIG. 8A shows the architecture of the installation of one part of the 4 buffer arrays (311, 312, 313, 314) to the static processing unit 101 in the comparator circuit module 100; while FIG. 8B shows the architecture of the installation of the other part of the 4 buffer arrays (311, 312, 313, 314) to the dynamic processing unit 102.

Referring back to FIG. 7, the enable signal delay circuit module 320 is coupled between the enable signal input port ENABLE and the input port of the NDFA circuit module 200, and which is composed of 4 serially-connected buffer units: including a first-stage buffer unit 321, a second-stage buffer unit 322, a third-stage buffer unit 323, and a fourth-stage buffer unit 324. In practice, for example, these buffer units (321, 322, 323, 324) can be each implemented with a flip flop (FF).

The installation of the buffer arrays (311, 312, 313, 314) and the buffer units (321, 322, 323, 324) constitutes a 5-stage pipeline architecture, wherein the first stage STAGE_1 is constituted by the first-layer logic circuit 110 and the first-stage buffer array 311; the second stage STAGE_2 is constituted by the second-layer logic circuit 120 and the second-stage buffer array 312; the third stage STAGE_3 is constituted by the third-layer logic circuit 130 and the third-stage buffer array 313; the fourth stage STAGE_4 is constituted by the fourth-layer logic circuit 140 and the fourth-stage buffer array 314; and the fifth stage STAGE_5 is constituted solely by the NDFA circuit module 200.

In operation, the logic operations from STAGE_1 to STAGE_5 can be clocked by using 5 consecutive clock pulses. At the completion of the first-stage operation on the first character of the input code sequence 41, the first-layer logic circuit 110 can be started to receive and process the second character of the input code sequence 41; and at the completion of the second-stage operation and start of the third-stage operation on the first character, the first-layer logic circuit 110 can be started to receive and process the third character of the input code sequence 41; and further at the completion of the third-stage operation and start of the fourth-stage operation on the first character, the first-layer logic circuit 110 can be started to receive and process the fourth character of the input code sequence 41; and so forth. This 5-stage pipelined processing can undoubtedly help boost the processing speed and thus offer a better performance than the prior art.

Second Preferred Embodiment

Figure 9:
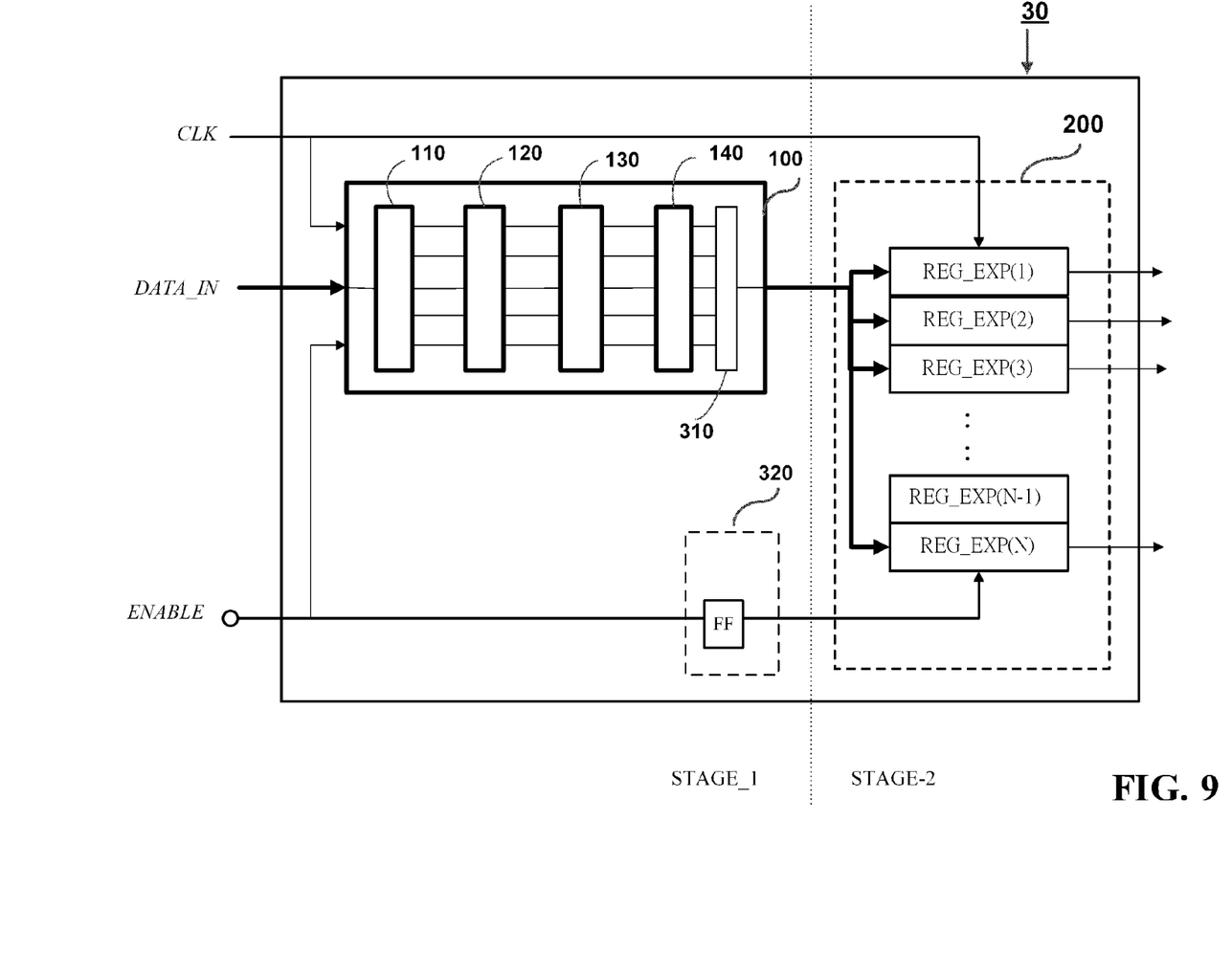
FIG. 9 is a schematic diagram showing the architecture of a second preferred embodiment of the regular expression pattern matching circuit of the invention.

As shown in FIG. 9, in the second preferred embodiment, the data signal delay circuit module 310 includes only one single stage of buffer array which is coupled to the output end of the fourth-layer logic circuit 140 in the comparator circuit module 100. Correspondingly, the enable signal delay circuit module 320 also includes only one single buffer unit (FF).

The foregoing circuit arrangement constitutes a 2-stage pipeline architecture (STAGE_1, STAGE_2) for processing of the input code sequence 41 through two pipelined stages. The resulted processing speed, however, is inferior to the 5-stage pipeline architecture described above.

Third Preferred Embodiment

Figure 10:
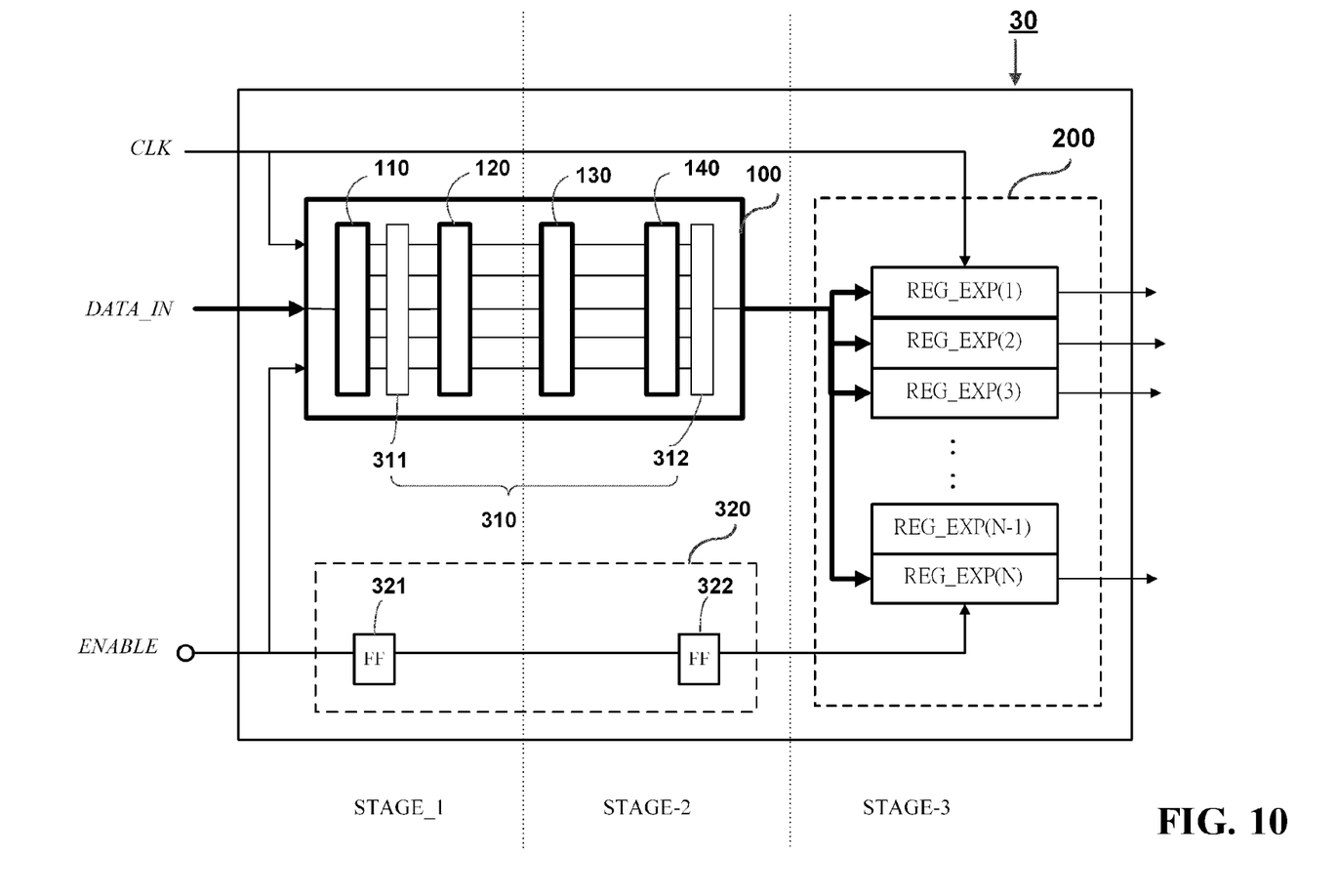
FIG. 10 is a schematic diagram showing the architecture of a third preferred embodiment of the regular expression pattern matching circuit of the invention.

As shown in FIG. 10, in the third preferred embodiment, the data signal delay circuit module 310 includes only two stages of buffer arrays: a first-stage buffer array 311 and a second-stage buffer array 312; wherein the first-stage buffer array 311 is coupled to the output end of the first-layer logic circuit 110, while the second-stage buffer array 312 is coupled to the output end of the fourth-layer logic circuit 140. Correspondingly, the enable signal delay circuit module 320 includes two serially-connected single buffer unit (FF), including a first-stage buffer unit 321 and a second-stage buffer unit 322.

The foregoing circuit arrangement constitutes a 3-stage pipeline architecture (STAGE_1, STAGE_2, STAGE_3) for processing of the input code sequence 41 through 3 pipelined stages. The resulted processing speed is inferior to the 5-stage pipeline architecture of the first preferred embodiment, but better than the 2-stage pipeline architecture of the second preferred embodiment.

Generalization of the Invention

The above-described 3 preferred embodiments of the invention are based on the example of a 4-layer circuit architecture of the comparator circuit module 100. Broadly speaking, however, the invention is not limited to the application on a 4-layer circuit architecture, and rather can be applied for use on an M-layer circuit architecture, where M is any integer number, such as 2, 3, 5, 6, or more.

Further, in the case of the comparator circuit module 100 having M layers of logic circuits, the number of the stages of buffer arrays installed to the data signal delay circuit module 310 and the number serially-connected buffer units installed to the enable signal delay circuit module 320 can be arbitrarily chosen to be an integer in the range from 1 to M. Fundamentally, a larger number of pipeline stages will result in a better processing speed but a greater degree of hardware complexity for implementation; whereas a smaller number of pipeline stages will result in a less degree of hardware complexity but a poor processing speed (which is nevertheless better than the prior art). In practice, a tradeoff between performance and hardware complexity is chosen by selecting a number of pipeline stages between 1 and M.

The invention has been described using exemplary preferred embodiments. However, it is to be understood that the scope of the invention is not limited to the disclosed embodiments. On the contrary, it is intended to cover various modifications and functional equivalent arrangements. The scope of the claims, therefore, should be accorded the broadest interpretation so as to encompass all such modifications and functional equivalent arrangements.

What is claimed is:

1. A regular expression pattern matching circuit for use with a data processing system for processing an input code sequence to check whether the input code sequence is matched to a pattern predefined by a regular expression, which comprises:
   an input interface having a data input port, an enable signal input port, and a clock signal input port;
   a comparator circuit module, which includes multiple layers of logic circuits and a plurality of output ports, wherein the multiple layers of logic circuits are used to perform predefined comparison operations on each character of the input code sequence to thereby determine the meaning of each character in the input code sequence;
   a data signal delay circuit module, which includes at least one stage of buffer array coupled to the output of at least one layer of the multiple layers of logic circuits in the comparator circuit module for providing a pipeline architecture in the comparator circuit module;
   an enable signal delay circuit module, which includes at least one stage of buffer unit that is at the same stage as the buffer array of the data signal delay circuit module and coupled to the enable signal input port for providing a synchronized pipeline architecture with the pipeline architecture in the comparator circuit module; and
   a regular expression pattern matching module, which is connected to the output of the buffer array of the data signal delay circuit module and includes an array of pattern matching units each of which is preset to one regular expression defined pattern for comparing whether the output of the comparator circuit module is matched to the predefined pattern.

2. The regular expression pattern matching circuit of claim 1, wherein the data processing system is a computer platform.

3. The regular expression pattern matching circuit of claim 1, wherein the data processing system is a firewall.

4. The regular expression pattern matching circuit of claim 1, wherein the data processing system is a network intrusion detection system (NIDS).

5. The regular expression pattern matching circuit of claim 1, wherein the input code sequence is an ASCII (American Standard Code for Information Interchange) compliant code sequence.

6. The regular expression pattern matching circuit of claim 1, wherein the input code sequence is an EBCDIC (Extended Binary Coded Decimal Interchange Code) compliant code sequence.

7. The regular expression pattern matching circuit of claim 1, wherein the comparator circuit module is implemented with an FPGA (Field Programmable Gate Array) module.

8. The regular expression pattern matching circuit of claim 1, wherein each buffer array in the data signal delay circuit module is an array of flip-flops.

9. The regular expression pattern matching circuit of claim 1, wherein each buffer unit in the enable signal delay circuit module is a flip-flop.

10. The regular expression pattern matching circuit of claim 1, wherein the regular expression pattern matching module is implemented with a non-deterministic finite-state automata (NDFA) circuit module.

11. The regular expression pattern matching circuit of claim 1, wherein the data signal delay circuit module and the enable signal delay circuit module are each equipped with one layer of buffer circuit for constituting a 2-stage pipeline architecture.

12. The regular expression pattern matching circuit of claim 1, wherein the data signal delay circuit module and the enable signal delay circuit module are each equipped with two layers of buffer circuits for constituting a 3-stage pipeline architecture.

13. The regular expression pattern matching circuit of claim 1, wherein the data signal delay circuit module and the enable signal delay circuit module are each equipped with a plurality of layers of buffer circuits for constituting a multi-stage pipeline architecture.

14. The regular expression pattern matching circuit of claim 1, wherein the at least one stage of buffer unit is selected from a plurality of stages of buffer units.

15. A regular expression pattern matching circuit for use with a data processing system for processing an input code sequence to check whether the input code sequence is matched to a pattern predefined by a regular expression, which comprises:
   an input interface having a data input port, an enable signal input port, and a clock signal input port;
   a comparator circuit module, which includes multiple layers of logic circuits and a plurality of output ports, wherein the multiple layers of logic circuits are used to perform predefined comparison operations on each character of the input code sequence to thereby determine the meaning of each character in the input code sequence;
   a data signal delay circuit module, which includes a plurality of buffer arrays coupled to the output ends of the multiple layers of logic circuits in the comparator circuit module for providing a pipeline architecture in the comparator circuit module;
   an enable signal delay circuit module, which includes a plurality of serially-connected buffer units corresponding to the pipeline architecture in the comparator circuit module and coupled to the data input port for providing a synchronized pipeline architecture with the pipeline architecture in the comparator circuit module; and
   a regular expression pattern matching module, which is connected to the output of the buffer arrays of the data signal delay circuit module and includes an array of pattern matching units each of which is preset to one regular expression defined pattern for comparing whether the output of the comparator circuit module is matched to the predefined pattern.

16. The regular expression pattern matching circuit of claim 15, wherein the input code sequence is an ASCII (American Standard Code for Information Interchange) compliant code sequence.

17. The regular expression pattern matching circuit of claim 15, wherein the input code sequence is an EBCDIC (Extended Binary Coded Decimal Interchange Code) compliant code sequence.

18. The regular expression pattern matching circuit of claim 15, wherein the comparator circuit module is implemented with an FPGA (Field Programmable Gate Array) module.

19. The regular expression pattern matching circuit of claim 15, wherein each buffer array in the data signal delay circuit module is an array of flip-flops.

20. The regular expression pattern matching circuit of claim 15, wherein each buffer unit in the enable signal delay circuit module is a flip-flop.

* * * * *